United States Patent Office 3,186,840
Patented June 1, 1965

3,186,840
DIRECT POSITIVE COLORED PHOTOGRAPHIC ELEMENTS CONTAINING DIHYDRAZONES AND PROCESS FOR FORMING COLORED MASKS THEREFROM
Walter Püschel, Dusseldorf, Ottmar Wahl, Baden-Baden, Willibald Pelz, Opladen, and Hans Scheilenberger and Karl Löffler, Leverkusen, Germany, assignors to Agfa Aktiengesellschaft, Leverkusen, Germany, a corporation of Germany
No Drawing. Filed Dec. 8, 1959, Ser. No. 858,052
Claims priority, application Germany, Dec. 11, 1958, A 30,924
14 Claims. (Cl. 96—9)

The present invention relates to color photography and more especially to color photography making use of a new type of components for the production of direct positive dyestuff images.

Processes are already known by which colored direct positive images of the object to be reproduced are obtained. These include for example the silver dye-bleaching process. These processes can also be used for the production of masks, especially for color photographic purposes. The dyestuffs formed in the conventional color photographic processes do not conform to the standards which theoretically are required. For example, magenta dyestuffs have an appreciable secondary absorption in the blue range, and cyan dyestuffs have secondary absorptions in the green and blue ranges. A number of processes have been disclosed for improving the properties of the dyestuffs by masking the secondary absorptions. The only processes comparable with the present process are those in which the masking image is an integral constituent of the color photographic material used. These processes are based on the use of colored color couplers, the natural absorption of which corresponds to the faulty absorption of the dyestuffs formed therefrom in the color photographic process. Such a process is for example described in United States Patent No. 2,449,966 and British Patent No. 698,046, in which the masks are produced automatically. They have the disadvantage that, owing to the high extinction of the dyestuffs which are used (for example azo dyestuffs of pyrazolones), the color density necessary for masking purposes is already reached with component concentrations which are still too low to produce the required gradation or sensitivity. In the process for eliminating such difficulties in matching colors that is described in United States Patent No. 2,725,291, less intensively colored azo-bis-pyrazolones are used, but this process is only suitable for the production of colored direct positive and negative images.

It has now been found that dicarbonyl dihydrazones of the general formula:

react with the oxidation or development products of color developers to form colorless coupling products, and consequently are especially suitable for the production of colored direct positive images.

In the general formula above:

$R_1$ and $R_2$ each represent a hydrogen atom, an alkyl radical with 1 to 20 carbon atoms, an aryl radical such as phenyl or naphthyl, an aralkyl radical such as benzyl, or a heterocyclic radical, for example, furyl, thienyl, 2-benzofuranyl (from cumarone or benzofuran), benzothienyl (from thionaphthene or benzothienyl), and pyridyl, it being possible for $R_1$ and $R_2$ together to be members necessary to complete an isocyclic or heterocyclic ring, such as is the case, for example, with dihydrazones of cyclopentanedione, cyclohexanedione or the series of the heterocyclic diketones, for example, with cumaran-2,3-dione (2,3-dihydrobenzofuran-2,3-dione) isatin;

$R_3$ and $R_4$ each represent an aromatic or heterocyclic radical, for example, phenyl or naphthyl radicals, wherein the hydrogen atoms can be substituted in any desired manner, for example with sulpho, sulphonamido, carboxy, carbamoyl, esterified carboxy, alkyl having 1 to 20 carbon atoms, halogen such as chlorine or bromine, cyano, nitro, hydroxy, alkoxy, aroxy, such as phenoxy, arylsulfonyl, aryl, aralkyl, heterocyclic radicals or amino groups, which in their turn can also carry additional substituents such as alkyl, aryl, acyl, or heterocyclic radicals, such as, for example, pyridyl, benzimidazolyl, benzothiazolyl or the like.

These dihydrazones are colorless or faintly colored compounds.

If a photographic silver halide emulsion layer having incorporated therein a dihydrazone of the above-mentioned type is exposed to an object to be reproduced, for instance, to a stepped wedge, and if it is thereafter developed with a so-called color developer, there is formed at the exposed areas a negative silver image and simultaneously a colorless coupling product by reaction of the development product of the color developer with the dihydrazone, in an amount in proportion to the exposure to light, whereas at the unexposed areas the dihydrazone remains unchanged and forms a very shallow or scarcely visible positive image.

It has further been found that these scarcely visible positive color images can be transformed into images of deeper color if the photographic layer, after the above development, is treated with suitable oxidizing agents, for example, with an aqueous solution of an oxidizing agent such as is customarily used for bleaching the silver of photographic silver images.

Although the dihydrazones may be used for producing positive color images in photographic elements containing a single silver halide emulsion layer, they are particularly suitable for the production of colored masking images in color photographic multilayer materials. For this purpose they are either incorporated into a suitably sensitized additional silver halide emulsion layer of a multilayer material, in which additional layer merely the masking image is produced, or they may be incorporated into at least one of those layers of the multilayer material which contain a color coupler for the production of the magenta or of the cyan partial color image so that a partial color image as well as a masking image is obtained in a single layer after exposing and processing such a material. In case the hydrazones are incorporated into an additional layer which is devoid of a color coupler, it is preferred to sensitize this layer in that region of the spectrum for which the layers for the production of the magenta and/or cyan partial color image are sensitized, for instance, for the green and/or for the red region of the spectrum. This masking layer is preferably so arranged within the multilayer material that it is in contact with that silver halide emulsion layer in which the partial image to be masked is produced, although it is also possible to choose any other sequence of layers in such a multilayer material. It is furthermore possible to incorporate the dihydrazone in a nonlight-sensitive colloid layer, such as a gelatin layer which is in contact with the partial image layer to be masked. The dihydrazones to be incorporated in the photographic layers should be resistant to diffusion. It is therefore preferred to use in this case dihydrazones which contain a higher alkyl radical of about 6 to 20, preferably 10 to 20 carbon atoms. Moreover, those dihydrazones are preferred which in addition to a higher alkyl radical contain a water-solubilizing group such as a carboxylic or a sulphonic acid sulfo group which compounds are preferably used in the form of alkali-metal (sodium, potassium, lithium), ammonium or other water-soluble salts, such as amine salts. The dihydrazones are usually applied in amounts of 1 to 20, preferably 5 to 15 grams per liter of silver halide emulsion or 80 grams of the binding agent of the colloid layer. The dihydrazones may also be incorporated into the colloid layer in finely dispersed form, for instance after having incorporated them in a water-permeable, water-insoluble solvent as described in United States Patents Nos. 2,304,940 and 2,322,027. It is also possible inter alia to work with dihydrazones which diffuse through the colloid layers and can preferably penetrate simultaneously with the solution of the color developer into the layer. As color developers, compounds are used which are known as such in the literature, the development or oxidation products of which are capable coupling with color couplers, such as pyrazolones or $\alpha$-naprthol derivatives, to form azomethine or indophenol dyestuffs.

These are for instance silver halide developers with primary amino groups, for example derivatives of p-phenylene diamines, p-aminophenol, 4-amino-pyrazolone and others.

As oxidizing agents, substances may be used which are capable to bleach the silver images of the photographic elements, such as ferric salts (potassium ferricyanide, ferric sulfate, ferric salts of ethylene-diaminetetraacetic acid, ferric salt of nitrilotriacetic acid, $N(CH_2COO)_3Fe$) bichromates, combinations of copper salts and hydrogen peroxide. These oxidizing agents are applied in the form of their aqueous solutions, the pH value of which may be adjusted to about 3 to 13.

By means of the oxidizing agent, the dihydrazones are transformed into intensively colored products, whereas the coupling products obtained by the preceding color development remain colorless. Thus, this process differs in principle from other known processes for the production of a direct positive image by chromogenic development, such as that described for example in United States Patent No. 2,449,966, according to which an intensively colored coupling component is transformed by the oxidized color developer into a dyestuff of different color which serves to build up the color image and must be removed from the layers by suitable means. The production of the direct positive image is thus directly linked to the formation of a negative color image. With the process of the present invention, on the other hand, the formation of the direct positive image is entirely independent. By this means, a greater freedom in the adaption or matching of the color mask to the color image is provided by the use of this process for the formation of color photographic negative films with positive color correction masks.

The dihydrazones can be prepared in known manner, for example, by reacting $\alpha$-diketones with hydrazines, for example, with phenylhydrazine and derivatives thereof. The $\alpha$-diketones are derived, from which the dihydrazones can be of aliphatic, aromatic, cycloaliphatic or heterocyclic nature. Another convenient method of preparation consists in coupling ketomethylene compounds reacting with diazonium salts and thereafter the keto groups with hydrazines.

Thus, it is possible, for example, to react 1,2-dicarbonyl compounds with hydrazines to form the dihydrazones, hereinafter referred to also simply as osazones. Depending on whether (a) a monohydrazone is prepared by reacting 1 mol of dicarbonyl compound with 1 mol of a hydrazine, which is then reacted with a second mol of a hydrazine, or whether (b) 1 mol of dicarbonyl compound is directly reacted with 2 mols of a hydrazine, it is possible to obtain osazones (corresponding to the general formula of the dicarbonyl hydrazones specified hereinbefore) with different hydrazine radicals or like hydrazine radicals, in which case $R_3$ in the general formula$=R_4$. For producing the osazones, it is also possible to produce preliminarily the monoxime of the dicarbonyl compound and to react this oxime with a hydrazine to produce an oximehydrazone, and then to react this with a second mol of another hydrazine while splitting off hydroxylamine.

Furthermore, $\alpha$-oxycarbonyl compounds such as $\alpha$-oxyaldehydes or $\alpha$-oxyketones can be reacted with excess hydrazine derivative to form hydrazones in known manner, or starting from the hydrazones of the $\alpha$-oxycarbonyl compounds, mixed osazones can be obtained with excess hydrazine. It is often advisable to use the $\alpha$-halogenocarbonyl compounds instead of the $\alpha$-oxycarbonyl compounds. Carbonyl compounds having a methylene group adjacent to the carbonyl group can also be coupled with a diazonium salt to form the monohydrazone of the corresponding diketone according to the equations:

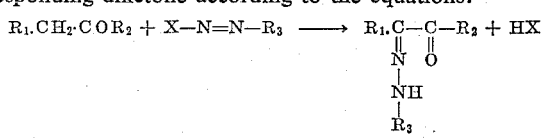

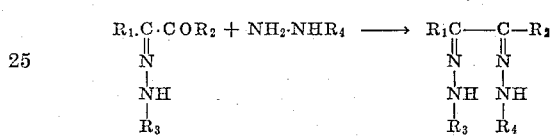

It is often advisable to activate the coupling capacity in the $\alpha$-methylene carbonyl compounds by substituting with negative groups. Such groups are, for example, alkylcarbonyl and phenylcarbonyl radicals (—COOR in which R is alkyl or phenyl), cyano, and halogen. In the case of the cyano and the alkoxycarbonyl and phenoxycarbonyl radicals (—COOR), these groups can easily be split off again, so that, for example, when alkylcarbonylacetic acid derivatives are used in accordance with the following equation:

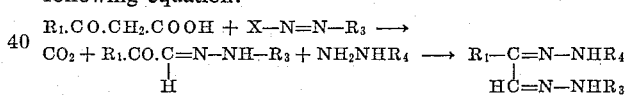

Osazones are obtained in more convenient manner than by the reaction in stages of the corresponding carbonyl compounds with two different hydrazines.

By reaction of the osazones of $\alpha$-ketoaldehydes with diazonium compounds, it is possible in accordance with the following equation:

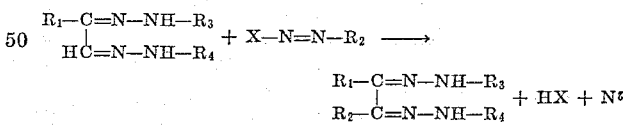

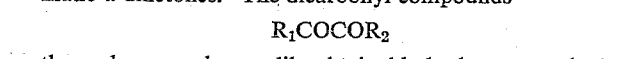

to obtain osazones of diketones. This method is of interest for the production of osazones of heterocyclic aromatic $\alpha$-diketones. The dicarbonyl compounds $$R_1COCOR_2$$

themselves are also readily obtainable by known methods.

*Example 1*

(a) 17 g. of p-sulphanilic acid are dissolved in 100 cc. of 2 N-sodium hydroxide solution and 60 cc. of water, 7 g. of sodium nitrite are added, and the solution is introduced at 0° C. into a mixture of 30 cc. of concentrated hydrochloric acid and 30 cc. of water. Stirring is continued for 15 minutes, the pH value is adjusted to between 5 and 6 with about 15 g. of sodium acetate, and the mixture is poured into solution of 36 g. of stearoylacetic acid ethyl ester and 30 g. of sodium acetate in 600 cc. of methanol. Stirring is continued for another 30 minutes, the precipitate is filtered by suction, washed with dilute methanol and dried in vacuo at room temperature.

Yield: 50 g. of $\alpha$-(p-sulphoazobenzene)-stearoyl acetic acid ethyl ester (Formula I hereinafter).

(b) 30 g. of this compound are introduced into a solution of 30 g. of sodium hydroxide in 500 cc. of water and heated to 60° C., whereupon it dissolves. The mixture is boiled for another 20 minutes and the still hot solution is neutralized with glacial acetic acid. 23 g. of 4-methoxy-3-sulphophenyl hydrazine are then added, boiled under reflux for 10 minutes and the still hot mixture is introduced into 1 liter of saturated sodium chloride solution, filtered by suction after standing and dried.

Yield: 40 g. of the compound represented by Formula III hereinafter.

8 g. of the osazone of the compound having Formula III are dissolved in 150 cc. of methanol and a quantity of 10% aqueous sodium hydroxide solution required to adjust the solution to a pH value of about 9 and incorporated into 1 kg. of a silver halide emulsion prepared in the usual way. A photographic layer produced with this emulsion mixture is exposed and developed for 5 minutes in a color developer having the composition:

| | G. |
|---|---|
| Sodium hexaphosphate | 1.0 |
| p-Diethylamino aniline sulphate | 2.0 |
| Anhydrous sodium sulphite | 2.0 |
| Potassium bromide | 1.0 |
| Potassium carbonate | 75.0 |

Water to make 1 liter of solution.

bleached with a bleaching bath consisting of 200 g. of potassium ferricyanide in 1 liter of aqueous solution and fixed in the usual way.

A positive yellow dyestuff image is obtained.

Example 2

The compound represented by Formula II hereinafter is prepared as described in Example 1 by replacing the sulphanilic acid in stage (a) with 4-amino-anisidine-2-sulphonic acid, and the 4-methoxy-3-sulphophenyl hydrazine in stage (b) with 4-sulphophenyl hydrazine.

The coupler of Formula II can be used, as described in Example 1, for the production of a positive yellow dyestuff image.

Example 3

The compound represented by Formula IV is prepared as described in Example 1 by replacing the sulphanilic acid of stage (a) with 4-amino-diphenylamine-2-sulphonic acid and the 4-methoxy-3-sulphophenyl-hydrazine in stage (b) with 2-chloro-5-sulphophenyl hydrazine.

The compound of Formula IV produces a magenta dyestuff image after treatment as described in Example 1. The magenta dyestuff has a maximum absorption band at 535 millimicrons.

Example 4

(a) 4-isododecyl-chloroacetophenone: 35 g. of $AlCl_3$ are introduced over a period of 30 minutes into a solution of 62 g. of isododecyl benzene and 32 g. of chloroacetyl chloride in 100 cc. of carbon disulphide. The mixture is thereafter heated for 3 hours to its boiling point. The carbon disulphide is distilled off and the mixture is then introduced into 200 cc. of water, 200 g. of ice and 20 cc. of HCl. The precipitated oil is taken up in 100 cc. of methylene chloride, the solution is dried over $CaCl_2$ and the solvent distilled off. The residue is distilled in vacuo, whereby a shortest possible distillation time is maintained.

B.P.$_{0.6\ mm.}$ from 180° C. Yield 40 g.

(b) 6.4 g. of the foregoing compound, 7 g. of sodium acetate and 100 cc. of methanol are heated for 3 hours to its boiling point. 12 g. of 4-sulphophenyl-hydrazine and 40 cc. of $H_2O$ are then added and boiling is continued for another 1½ hours. The mixture is thereafter introduced into 250 cc. of saturated sodium chloride solution, left to stand for 4 hours, filtered by suction and dried in vacuo.

Yield: 7 g. of the compound represented by Formula V.

When used as described in Example 1, this compound yields a positive yellow dyestuff image.

Example 5

(a) 10.9 g. of 4-ethoxyaniline-3-sulphonic acid were diazotized by the usual method. After destroying the excess nitrite, the diazonium salt solution is adjusted to a pH value of 6 by adding solid sodium acetate. This solution is slowly added with stirring to a solution of 20 g. of stearoylacetic acid ester in 250 cc. of methanol heated to 28° C., stirred for 10 minutes at 28° C., and then cooled and filtered by suction to remove the excess stearoylacetic acid ethyl ester. This product is recrystallized from acetone and dried. The dry product is slowly heated to 60° C. with 100 cc. of 2 N NaOH while stirring, kept for 20 minutes at this temperature and then briefly boiled, cooled, filtered with suction, introduced into 10% acetic acid, filtered by suction, stirred while cold with acetone, filtered by suction and dried.

(b) 5.1 g. of the foregoing product, 50 cc. of water, 70 cc. of 10% sodium acetate solution and 3.9 g. of 5-sulpho-2-hydrazine - 4' - hydroxy - 3' - carboxydiphenyl sulphone are heated in 40 minutes to 60° C. while stirring, cooled, adjusted to a pH value of 8.3 by dropwise addition of dilute NaOH, whereupon it initially becomes jelly-like and, with further stirring, it solidifies to a precipitate which can be satisfactorily exhausted.

The product has the composition represented by Formula VI. When used as described in Example 1, a positive yellow dyestuff image is obtained.

Example 6

5.1 g. of the product prepared as described in Example 5a were heated for 40 minutes to 60° C. with 50 cc. of water, 50 cc. of 10% sodium acetate solution and 3.7 g. of 5-acetamino-2-hydrazino-4'-hydroxy-3'-carboxy diphenyl sulphone, adjusted to a pH value of 8 by adding dilute NaOH, cooled and precipitated by adding 500 cc. of 25% sodium chloride solution.

The product is represented by Formula VII.

When used in accordance with Example 1, a deep red-orange colored positive dyestuff image is obtained.

Example 7

4.6 g. of 4-octadecoxy-phenyl-hydrazine-3-sulphonic acid, 50 cc. of 10% sodium acetate solution, 2 cc. of glacial acetic acid and 0.6 cc. of 50% glyoxal are heated for 1 hour to 45–48° C. while stirring. A red precipitate is formed, which is filtered with suction after cooling and then dried. Yield: 4.5 g. of the compound represented by Formula VIII.

When used as described in Example 1, a positive reddish-brown dyestuff image is obtained.

Example 8

9.2 g. of 4-octadecoxy-phenyl-hydrazine-3-sulphonic acid, 100 cc. of 10% sodium acetate solution, 1.2 g. of 3-phenyl-propane-2,3-dione are heated for 2 hours at 60 to 65° C. while stirring, cooled, filtered with suction and dried. Yield: 10.1 g. of the compound represented by Formula IX.

When used as described in Example 1, a positive yellow dyestuff image is obtained.

Example 9

9.2 g. of 4-octadecoxy-phenyl-hydrazine-3-sulphonic acid, 100 cc. of 10% sodium acetate solution, 4 cc. of glacial acetic acid and 1.5 g. of cumaran-2-dione(2,3-dihydrobenzofuran-2,3-dione) are heated for 2 hours to 60 to 65° C. while stirring, cooled, filtered with suction and dried.

Yield: 7.8 g. of the compound represented by Formula X.

The osazone thus obtained is used and processed as described in Example 1. After fixing, it is washed for another 10 minutes in a 2 N-acetic acid solution. A yellow positive dyestuff image is obtained.

Example 10

(a) 8.7 g. of 4-aminobenzene sulphonic acid were diazotized by a conventional method, the excess of nitrite destroyed and the solution adjusted to a pH value of 6 by adding solid sodium acetate.

This solution was added at 0° C. to the solution of 7 g. of 1,1-dimethyl-cyclohexane-3,5-dione (which is also known as 5,5-dimethyl-1,3-cyclohexanedione, dimedone and methone) in 75 cc. of methanol. With the addition, the solution immediately became yellow in color, and after standing overnight in a refrigerator, lemon-yellow crystals precipitated, which were filtered with suction and dried.

(b) 3.2 g. of the above compound (a), 9.2 g. of 4-octadecoxy-phenyl-hydrazine-3-sulphonic acid, 75 cc. of water and 2 N-sodium hydroxide solution sufficient to produce a pH value of 5 are heated for 2 hours on a boiling water bath while stirring; after cooling, 2 N-sodium hydroxide solution is added until the pH value is 8 and the reaction product is precipitated by adding 250 cc. of saturated potassium chloride solution. The compound has the composition represented by Formula XI. When used as described in Example 1, a positive brown dyestuff image is obtained.

Example 11

Four (4) grams of 2-acetylcumarone (2-acetylbenzofuran) is converted as described by W. Reid and K. Sommer in Annalen, vol. 611, page 114 (1958), into cumaryl-(2)-glyoxal (2-glyoxyloylbenzofuran) by oxidation with selenium dioxide. The 2-glyoxyloylbenzofuran thus obtained is heated for half an hour to 60 to 65° C. with 50 cc. of dimethyl formamide, 20 cc. of 2 N-sodium acetate solution and 11.4 g. of 4-octadecoxy-phenyl-hydrazine-3-sulphonic acid while stirring on a water bath, whereupon 6.6 g. of 73% phenyl hydrazine-4-sulphonic acid are added, and the reaction mixture is kept for another half an hour at the temperature indicated. After cooling, 50 cc. of water are added to the solution and precipitation is caused by sodium chloride solution. The precipitate is filtered with suction and dried. The compound has the composition represented by Formula XII. When used as described in Example 1, a positive yellow dyestuff image is formed.

Example 12

Reaction product of 2-glyoxyloyl-benzofuran. 4 g. of 2-acetylbenzofuran is oxidized as described in the preceding example to form 2-glyoxyloyl-benzofuran. After distilling off the dioxane, the residue has added thereto 50 cc. of dimethyl formamide, 20 cc. of 2 N-sodium acetate solution and 9.2 g. of 4-dodecoxy-phenyl hydrazine-3-sulphonic acid, and the mixture is heated while stirring to 60 to 65° C., whereupon 9.6 g. of 2-hydrazino-4-sulpho-3'-carboxy - 4' - hydroxy-diphenyl sulphone are added, heating is continued for another half an hour at 75° C., the mixture is cooled and introduced into 25% sodium chloride solution; the product precipitates in greasy form and becomes solid on stirring with sodium chloride solution. It is then filtered with suction and dried.

The compound has the composition represented by Formula XIII and, when used in accordance with Example 1, produces a yellow dyestuff image.

Example 13

The compound represented by Formula XIV is prepared by a method analogous to that described in Examples 1 to 3. A light-sensitive material coated upon a transparent support prepared as described in Example 1(b) is developed with the color developer compound disclosed in Example 4 and after subsequent rinsing, it is (a) in one case bleach-fixed in a bleaching-fixing bath, as described in Example 5 of German Patent No. 866,605, and (b) in another case, it is treated in a bleaching bath consisting of 100 g. of potassium ferricyanide and 10 g. of sodium carbonate in 1000 cc. of water and fixed in the usual way.

After treatment referred to as (a), a slightly yellowish colored positive image is obtained with a color density of 0.3 measured behind a Schott filter BG 12/2 mm. The treatment referred to as (b) a yellow positive color image is obtained having a maximum color density of 1.65 when measured behind the same filter.

Example 14

(a) 4.5 g. of 4-amino-N-methyl-N-stearyl-aniline-2-sulphonic acid are formed into a paste with 40 cc. of methanol and dissolved in 30 cc. of water and 11 cc. of 2 N-sodium hydroxide solution at about 50° C. 0.7 g. of sodium nitrite is then added and the still warm solution is so introduced in to 30 cc. of ice-cooled 2 N-hydrochloric acid that the temperature rises to about 20° C. while the introduction is being carried out. Stirring is continued for 1 hour, the precipitated diazonium salt is filtered off with suction and, while still moist, it is formed into a paste with 60 cc. of methanol.

The suspension of the diazonium salt prepared in this way is introduced at room temperature into a solution of 1.5 g. of alpha-methyl acetoacetic ester in 60 cc. of methanol and 30 cc. of 2 N-sodium hydroxide solution, which had been standing for 24 hours at room temperature. The compound immediately precipitates, is filtered with suction after 30 minutes triturated with acetone, and then filtered with suction. Yield 5 g.

(b) 5.4 g. of the compound (a) are dissolved with 1.1 g. of phenyl hydrazine and 5 g. of sodium acetate by brief heating and then left to stand overnight. The solution is formed into a paste with 150 cc. of saturated sodium chloride solution and 100 cc. of water, filtered with suction and dried in vacuo at room temperature.

Yield: 5 g. of the compound according to Formula XV.

Example 15

5.1 g. of the product prepared according to Example 5a are heated with 75 cc. of 2 N-sodium acetate solution and 3.5 g. of 4-sulpho-2-hydrazine-4'-methyldiphenyl sulphone for half an hour at 80° C; it is thereafter adjusted to a pH value of 8, cooled and filtered with suction (Formula XVI).

8 g. of the compound (Formula XVI) were used to prepare, as described in Example 1, in a photographic material, which is developed in a developer with the following composition:

| | |
|---|---|
| Sodium hexaphosphate _____ g__ | 1.0 |
| 1 - phenyl - 4 - aminopyrazolone - 3 - carboxylic acid amide _____ g__ | 5.0 |
| Anhydrous sodium sulphite _____ g__ | 2.0 |
| Potassium bromide _____ g__ | 1.0 |
| Anhydrous potassium carbonate _____ g__ | 75.0 |
| Water _____ l__ | 1 |

After bleaching and fixing as described in Example 1, a positive yellow dyestuff image is obtained.

Example 16

4 g. of 2-acetylbenzofuran are oxidized as described in Example 11 to form 2-glyoxyloylbenzofuran. After distilling off the dioxane, there are added to the residue 50 cc. of dimethyl formamide, 20 cc. of 2 N-sodium acetate solution and 11.4 g. of 4-octadecoxy-phenyl hydrazine-3-sulphonic acid and heated for half an hour while stirring to 60 to 65° C., and after this time there are added 6.2 g. of 4-acetamino-phenyl-hydradine-3-sulphonic acid, and the mixture is heated after 1 hour to 70° C., cooled, precipitated by adding 25% NaCl solution, filtered with suction and dried (Formula XVII).

8 g. of the compound (Formula XVII) are used to prepare, as described in Example 4 in a photographic material. It is developed in a developer having the following composition:

| | |
|---|---|
| Sodium hexaphosphate | g-- 1.0 |
| 2,6-dichloro-4-aminophenol | g-- 5.0 |
| Anhydrous sodium sulphite | g-- 2.0 |
| Potassium bromide | g-- 1.0 |
| Anhydrous potassium carbonate | g-- 75.0 |
| Water | l-- 1 |

After bleaching and fixing as described in Example 1, a positive yellow dyestuff image is obtained.

*Example 17*

3.7 g. of 2-(4-hydrazinophenyl)-3-dodecyl-benzimidazole-6-sulphonic acid are dissolved while heating in 20 cc. of saturated aqueous sodium acetate solution and 20 cc. of propanol. After adding 0.32 g. of diacetyl, the mixture is heated for about 20 minutes to 70°, the cooled solution is diluted with 50 cc. of water and such a quantity of 30% acetic acid is added that the product precipitates. The supernatant liquid is decanted off, the residue is stirred with a small quantity of water, filtered with suction and dried.

Yield: 3.3 g.

The compound, which is represented by Formula XVIII, gives a positive yellow image when incorporated into a silver halide emulsion and developed as described in Example 1.

*Example 18*

A solution of 11.2 g. of 2-(3-hydrazinophenyl)-3-octadecyl-benzimidazole-6-sulphonic acid and 9 g. of anhydrous sodium acetate in 4 cc. of propanol and 30 cc. of water is stirred for half an hour at 25–30° C. while adding 1.7 g. of diacetyl. 4.6 g. of 4-ethoxy-phenylhydrazine-3-sulphone acid are then added and a solution is obtained by heating to 85° C. This temperature is maintained for half an hour, the dihydrazone starting to precipitate. The precipitation is completed by cooling and adding 60 cc. of 50% acetic acid, the supernatant solution is decanted and the residue is filtered with suction after stirring with acetone and then dried.

Yield: 9.8 g.

The product (Formula XIX) gives a positive yellow image after being cast in a silver halide emulsion and developed as described in Example 1.

*Example 19*

(a) 21 g. of 4-aminophenetol sulphonic acid(2) are diazotized in accordance with the method disclosed in Example 1. The resulting diazonium salt solution is adjusted to a pH value of about 6 by addition of sodium acetate and added at 0° C. to a solution of 19.4 g. of isonicotinoyl acetic acid ethyl ester and 16 g. of sodium acetate (anhydrous) in 200 cc. of methanol. Stirring is continued for another 30 mins. Thereafter 400 cc. of an aqueous 25% sodium chloride solution are added and the faintly yellow precipitate which forms is sucked off, dried and recrystallized from acetone.

Yield: 25 g., the compound corresponds to Formula XX.

(b) The above compound is dissolved in 200 cc. of 1 N sodium hydroxide solution, slowly heated to 60° C., and thereafter kept for 10 minutes at 90° C., cooled with ice-water and neutralized by addition of glacial acetic acid. The solution is concentrated by vacuum evaporation and the remaining semi-solid product is treated with warm acetone. After cooling, the solid product which has formed is sucked off. Its formula is represented by Formula XXI.

(c) 10 g. of the foregoing compound (Formula XXI) are mixed with 100 cc. of water, 140 cc. of an aqueous 10% sodium acetate solution and 0.1 g. of 4-octadecoxyphenylhydrazine 3-sulfonic acid (3-sulfo-4-octadecoxyphenylhydrazine). The resulting solution is kept whilst stirring for one hour at 60° C., thereafter cooled with ice-water. The precipitate which has formed is filtered off with suction and dried. The compound is represented by Formula XXII.

This compound is used as described in Example 1 to produce a silver halide emulsion which upon development forms a positive yellow dyestuff image.

*Example 20*

3 g. of isatin and 18.3 g. of 4-octadecoxyphenylhydrazine 3-sulfonic acid (3-sulfo-4-octadecoxyphenylhydrazine) are mixed with 100 cc. of dimethylformamide and 20 cc. of 2 N aqueous sodium acetate solution. The mixture is heated for 1 hour whilst stirring at 60 to 65° C., thereafter filtered with suction and the filtrate has added thereto sodium chloride to precipitate a compound represented by Formula XXIII. The precipitate is filtered by suction, washed with water and dried in vacuo at room temperature.

The compound is used as described in Example 1 to produce a silver halide emulsion which upon development forms production of a positive yellow dyestuff image.

*Example 21*

The compound represented by Formula XXIV is obtained in accordance with the method described in Example 1, by replacing in step (a) the sulphanilic acid, by an equivalent amount of 4-nitroaniline -3-carbonic acid and in step (b) the 4-methoxy-3-sulphonphenylhydrazine, by an equivalent amount of 4-ethoxy-3-sulphophenylhydrazine.

The compound of Formula XXIV as well as the compounds described in the following Examples 22 to 39 are each formulated into silver halide emulsions which are then developed and produce positive yellow dyestuff images as described in Example 1.

*Example 22*

The compound of Formula XXV is obtained in accordance with the method described in Example 1 by replacing in step (a) the sulphanilic acid, by an equivalent amount of 2-ethoxy-naphthyl amine-6-sulphonic acid and in step (b) the 4-methoxy-3-sulphophenylhydrazine, by an equivalent amount of 5-acetamino-2-hydrazinobenzene-1-sulfonic acid.

*Example 23*

The compound of Formula XXVI is obtained in accordance with the method described in Example 1, by replacing in step (a) the sulphanilic acid, by an equivalent amount of 2-ethoxy-naphthylamino-6-sulfonic acid and in step (b) the 4-methoxy-3-sulphophenylhydrazine, by an equivalent amount of 2-ethoxynaphthylamine-6-sulfonic acid.

*Example 24*

The compound of Formula XXVII is obtained in accordance with the method described in Example 1, by replacing in step (a) the sulphanilic acid, by an equivalent amount of 2-amino-1-phenoxy-benzene-5-sulphonic acid and in step (b) the 4-methoxy-3-sulphophenylhydrazine, by an equivalent amount of 5-(N-oxalyl-amino)-2-hydrazino-1-methyl-benzene-sulphonic acid-(4).

*Example 25*

The compound of Formula XXVIII is obtained in accordance with the method described in Example 1, by replacing in step (a) the sulphanilic acid, by an equivalent amount of 2-amino-3-chlorotoluene-sulphonic acid-(5) and in step (b) the 4-methoxy-3-sulphophenylhydrazine, by an equivalent amount of 4-hydrazino-1-phenoxy-benzene-sulphonic acid-(2).

*Example 26*

The compound of Formula XXIX is obtained in accordance with the method described in Example 1, by replacing in step (a) the sulphanilic acid, by an equivalent amount of 4-amino-1-phenoxy-benzene-sulphonic acid-(2) and in step (b) the 4-methoxy-3-sulphophenylhydrazine, by an equivalent amount of 4-hydrazino-1-phenoxy-benzene-sulphonic acid-(2).

*Example 27*

The compound of Formula XXX is obtained in accordance with the method described in Example 1, by replacing in step (a) the sulphanilic acid, by an equivalent amount of 4-amino-1-phenoxy-benzene-sulphonic acid-(3) and in step (b) the 4-methoxy-3-sulphophenylhydrazine, by an equivalent amount of phenylhydrazine-3-carbonic acid.

*Example 28*

The compound of Formula XXXI is obtained in accordance with the method described in Example 1, by replacing in step (a) the sulphanilic acid, by an equivalent amount of 4-amino-1-phenoxybenzene-sulphonic acid-(2) and in step (b) the 4-methoxy-3-sulphophenylhydrazine, by an equivalent amount of 4-ethoxyphenyl-hydrazine-sulphonic acid.

*Example 29*

The compound of Formula XXXII is obtained in accordance with the method described in Example 1, by replacing in step (a) the sulphanilic acid, by an equivalent amount of 4-amino-1-phenoxybenzene-sulphonic acid-(2) and in step (b) the 4-methoxy-3-sulphophenylhydrazine, by an equivalent amount of 1-methyl-2-hydrazinobenzene-4,5-disulfonic acid.

*Example 30*

The compound of Formula XXXIII is obtained in accordance with the method described in Example 1 by replacing in step (a) the sulphanilic acid, by an equivalent amount of 2-ethoxy-naphthylamine-6-sulphonic acid and in step (b) the 4-methoxy-3-sulphophenylhydrazine, by an equivalent amount of phenylhydrazine-3-sulphonic acid.

*Example 31*

The compound of Formula XXXIV is obtained in accordance with the method described in Example 1, by replacing in step (a) the sulphanilic acid, by an equivalent amount of 2-ethoxy-naphthylamin-6-sulphonic acid and in step (b) the 4-methoxy-3-sulphophenylhydrazine, by an equivalent amount of phenyl-hydrazine-3-carbonic acid.

*Example 32*

The compound of Formula XXXV is obtained in accordance with the method described in Example 1, by replacing in step (a) the sulphanilic acid, by an equivalent amount of 2-nitraniline-4-sulphonic acid and in step (b) the 4-methoxy-3-sulphophenylhydrazine, by an equivalent amount of 4-ethoxy-phenyl-hydrazine-3-sulphonic acid.

*Example 33*

The compound of Formula XXXVI is obtained in accordance with the method described in Example 1, by replacing in step (a) the sulphanilic acid, by an equivalent amount of 3-nitraniline-4-sulphonic acid and in step (b) the 4-methoxy-3-sulphophenylhydrazine, by an equivalent amount of 4-ethoxy-phenylhydrazine-3-sulphonic acid.

*Example 34*

The compound of Formula XXXVII is obtained in Example 1, by replacing in step (a) the sulphanilic acid, by an equivalent amount of 4-amino-1-phenoxy-2-sulphonic acid and in step (b) the 4-methoxy-3-sulphophenylhydrazine, by an equivalent amount of 5-oxalyl-amino-2-hydrazino-benzene-sulphonic acid-(1).

*Example 35*

The compound of Formula XXXVIII is obtained in Example 1, by replacing in step (a) the sulphanilic acid, by an equivalent amount of 4-amino-1-phenoxy-sulphonic acid-(2) and in step (b) the 4-methoxy-3-sulphophenylhydrazine, by an equivalent amount of phenyl-hydrazine-3-$\omega$-methane-sulphonic acid.

*Example 36*

The compound of Formula XXXIX is obtained in Example 1, by replacing in step (a) the sulphanilic acid, by an equivalent amount of 4-amino-1-phenoxy-benzene-sulphonic acid-(2) and in step (b) the 4-methoxy-3-sulphophenylhydrazine, by an equivalent amount of phenyl-hydrazine-4-sulphonamide.

*Example 37*

The compound of Formula XL is obtained in Example 1, by replacing in step (a) the sulphanilic acid, by an equivalent amount of 2-ethoxynaphthylamine-6-sulfonic acid and in step (b) the 4-methoxy-3-sulphophenylhydrazine, by an equivalent amount of 4-ethoxy-phenyl-hydrazine-3-sulphonic acid.

*Example 38*

The compound of Formula XLI is obtained in Example 1, by replacing in step (a) the sulphanilic acid, by an equivalent amount of 4-amino-diphenylamino-3-sulphonic acid and in step (b) the 4-methoxy-3-sulphophenylhydrazine, by an equivalent amount of benzthiazoylhydrazino-5-sulphonic acid.

*Example 39*

Arranged on a film support are
(a) A red sensitive gelatin silver bromo-iodide emulsion layer having incorporated therein a diffusion-resistant cyan coupler, for example, 4-sulfo-1-naphthol-2-carboxylic acid stearyl anilide, thereupon
(b) A green sensitive gelatin silver bromo-iodide emulsion layer having incorporated therein a diffusion-resistant magenta coupler, for example, 1-(4'-sulphophenyl)-3-palmityl-pyrazolone-(5) thereupon
(c) A green sensitive gelatin silver bromo-iodide emulsion containing per liter of emulsion 10 g. of the compound of formula VI in the form of the sodium salt, thereupon
(d) A yellow filter layer containing colloidal silver, thereupon
(e) A blue sensitive gelatin silver bromo-iodide emulsion layer having incorporated therein a diffusion-resistant yellow coupler, for example, 4-stearylamido-benzoyl acetic acid-amido-isophthalic acid.

The photographically exposed multilayer material is developed in a color developer having the following composition:

| | |
|---|---|
| 4-amino diethylaniline sulphate _____ g__ | 2.50 |
| Anhydrous potassium carbonate _____ g__ | 70.00 |
| Potassium bromide _____ g__ | 2.00 |
| Anhydrous sodium sulphite _____ g__ | 2.00 |
| Water _____ liter__ | 1 |

Development is followed by application of a bleaching bath consisting of a 20 percent aqueous solution of potassium ferricyanide and of a fixing bath consisting of a 10 percent aqueous solution of sodium thiosulfate.

The processed material contains negative yellow, magenta and cyan partial images in the image layers (a), (b), and (e) and a positive yellow image in the masking layer (c).

This image can be printed onto a multilayer printing material to obtain positive color-corrected multilayer images.

(I) 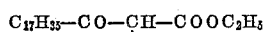
(II) 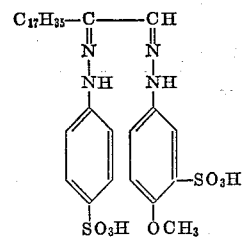
(III) 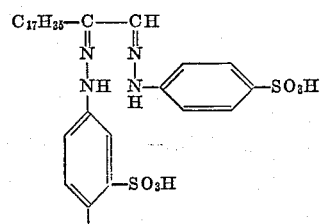
(IV) 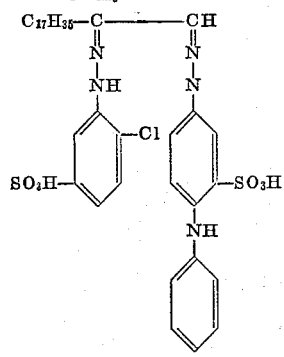
(V) 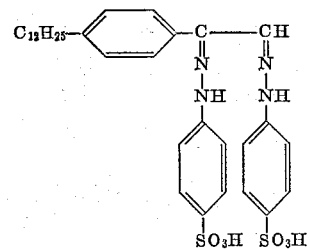
(VI) 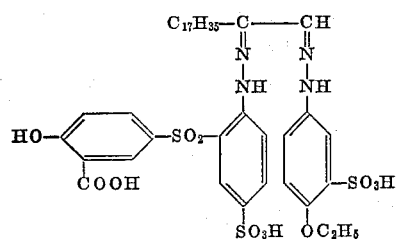
(VII) 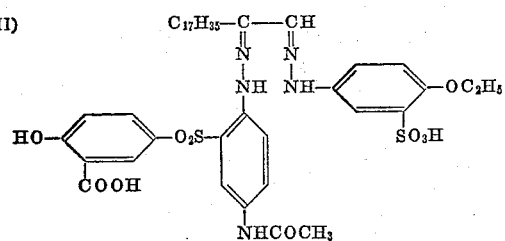
(VIII) 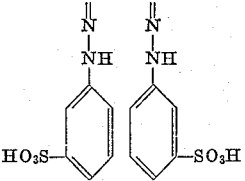
(IX) 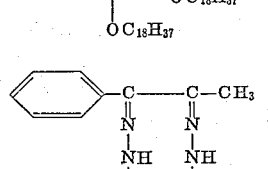
(X) 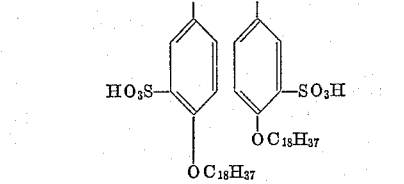
(XI) 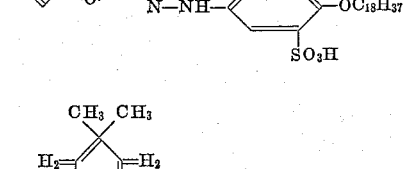
(XII) 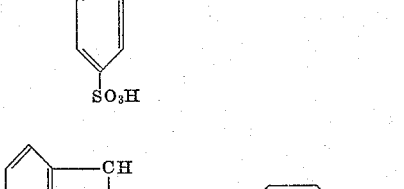
(XIII) 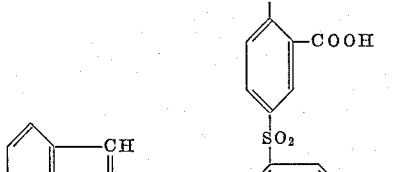

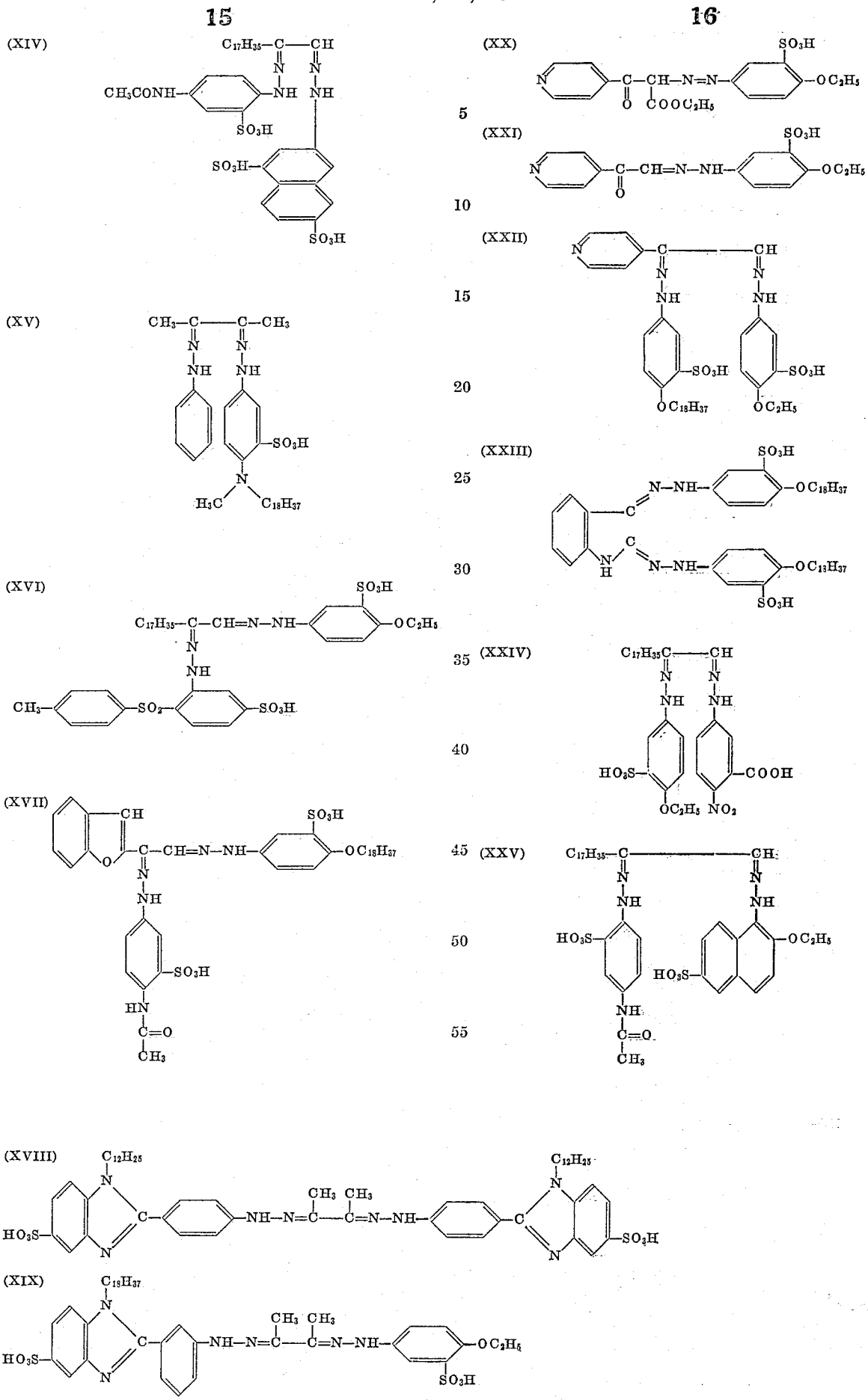

(XXVI) 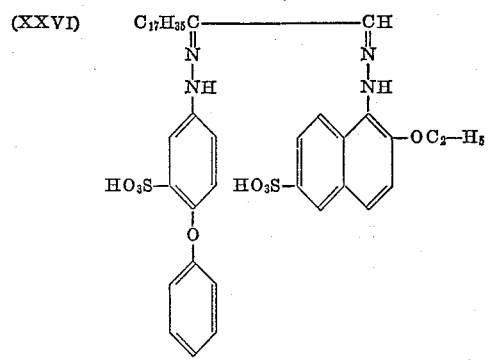
(XXXI) 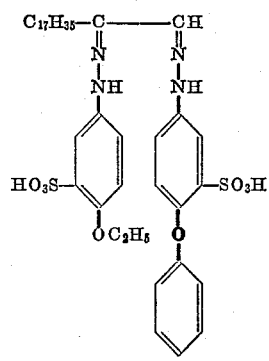
(XXVII) 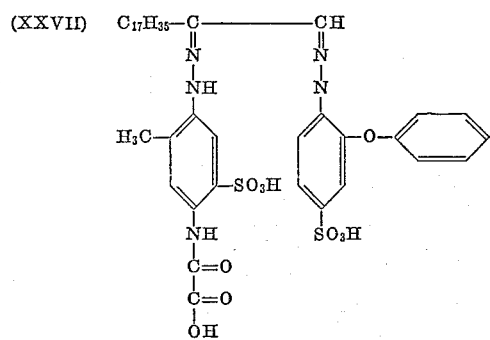
(XXXII) 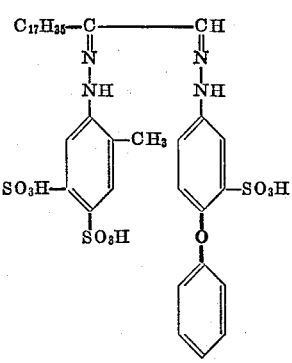
(XXVIII) 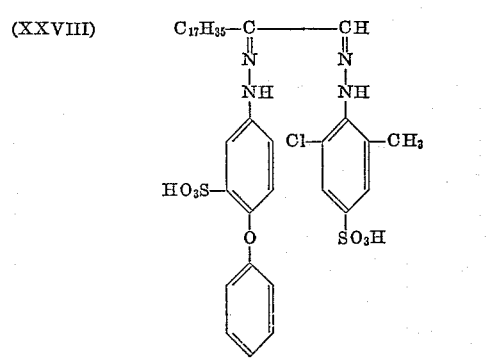
(XXXIII) 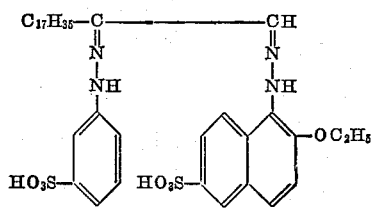
(XXXIV) 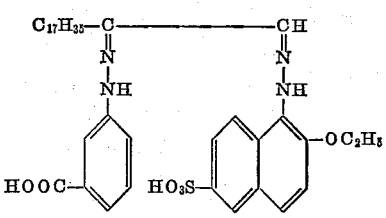
(XXIX) 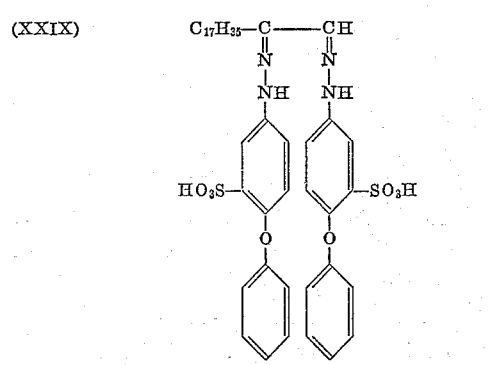
(XXXV) 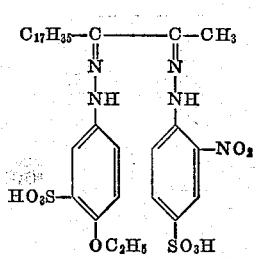
(XXX) 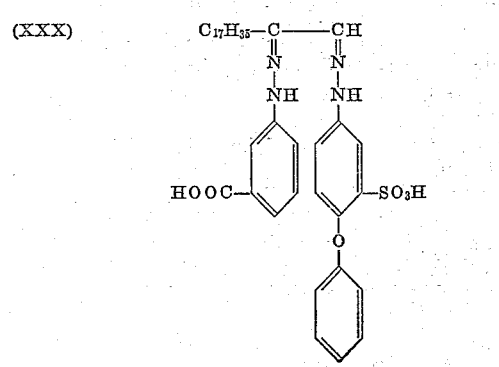
(XXXVI) 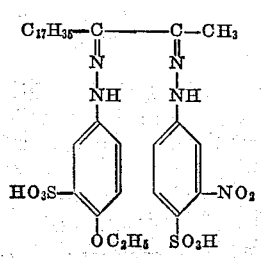

(XXXVII) 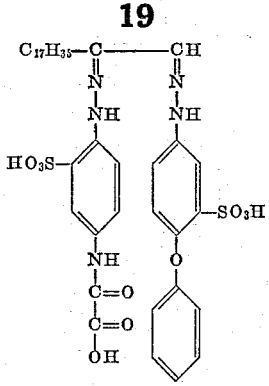

(XXXVIII) 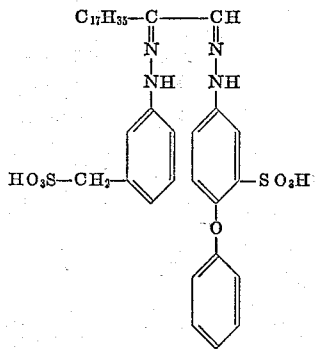

(XXXIX) 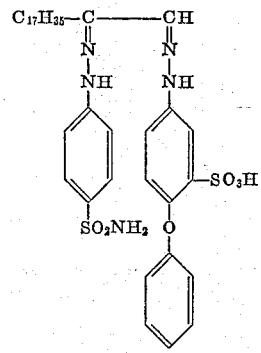

(XL) 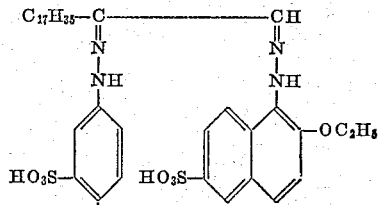

(XLI) 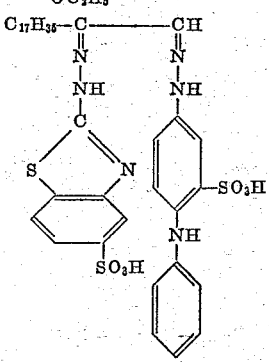

We claim:

1. Process of producing a direct positive colored image in a photographic silver halide emulsion layer which comprises incorporating in said layer a dihydrazone of the general formula

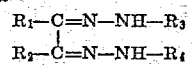

in which $R_1$ and $R_2$ each represent a radical of the group consisting of hydrogen, alkyl up to 20 carbon atoms, phenyl, naphthyl, benzyl, furyl, thienyl, 2-benzo-furanyl, benzothienyl and pyridyl; $R_1$ and $R_2$ together with the carbon atoms adjacent to each are the atoms required to complete a ring of the group consisting of cyclopentane, cyclohexane, 2,3-dihydrobenzo-furan and 2,3-dihydroindole; $R_3$ and $R_4$ each represent a radical of the group consisting of aromatic and heterocyclic radicals which are free of groupings capable of forming colored products by coupling with oxidation products of primary aromatic amine silver halide developing agents, exposing and developing the said layer with a primary amine silver halide developing agent, the development product of which reacts in the exposed areas of the said layer with the said dihydrazone to form a practically colorless reaction product which is stable to silver bleaching agents, treating the said layer with a silver bleaching agent to transform the said dihydrazone at the non-exposed areas of the layer to a dyestuff image and fixing the said layer.

2. A process as defined in claim 1 in which the dihydrazone is the compound represented by the formula in claim 1 in which $R_1$ is hydrogen, $R_2$ is heptadecyl, $R_3$ is 4-sulfophenyl and $R_4$ is 4-methoxy-3-sulfophenyl.

3. A process of producing a masking image in a multilayer photographic material comprising several silver halide emulsion layers, wherein at least one of the said layers contains an uncolored color-forming coupler which is reactive with the oxidation product of a primary aromatic amine developing agent to form a dyestuff in the said layer, and wherein at least one of the said layers contains a dihydrazone of the following general formula

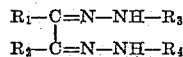

in which $R_1$ and $R_2$ each represent a radical of the group consisting of hydrogen, alkyl up to 20 carbon atoms, phenyl, naphthyl, benzyl, furyl, thienyl, 2-benzofuranyl, benzothienyl, and pyridyl; $R_1$ and $R_2$ together with the carbon atoms adjacent to each are the atoms required to complete a ring of the group consisting of cyclopentane, cyclohexane, 2,3-dihydrobenzo furan and 2,3-dihydroindole; $R_3$ and $R_4$ each represent a radical of the group consisting of aromatic and heterocyclic radicals which are free of groupings capable of coupling to form colored reaction products, with oxidation products of primary aromatic amine silver halide developing agents, which comprises exposing and developing the said multilayer photographic material to form a dyestuff image from the said uncolored coupler and to form a reaction product from said dihydrazone, which is stable to silver bleaching agents, and treating the said material with a silver bleaching agent to transform the said dihydrazone at the unexposed areas into a masking dyestuff image which is negative with respect to the said color image.

4. A process according to claim 3 in which the said uncolored coupler is a pyrazolone derivative which reacts with the development product of the developer to form a magenta dyestuff image.

5. A process according to claim 3 in which the said uncolored coupler is an alpha naphthol derivative which reacts with the development product of the developer to form a cyan dyestuff image.

6. A process according to claim 3, in which the said silver halide emulsion layers contain the said uncolored coupler and said dihydrazone are sensitive to the same region of the spectrum.

7. A process according to claim 3 in which the said uncolored coupler and the said dihydrazone are incorporated in the same silver halide emulsion layer.

8. A photographic material comprising in combination a support, a silver halide emulsion layer, and a non-light-sensitive colloid layer, at least one of the said layers containing a dihydrazone of the general formula

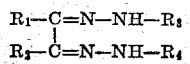

in which $R_1$ and $R_2$ each represent a radical of the group consisting of hydrogen, alkyl up to 20 carbon atoms, phenyl, naphthyl, benzyl, furyl, thienyl, 2-benzofuranyl, benzothienyl, and pyridyl; $R_1$ and $R_2$ together with the carbon atoms adjacent to each are the atoms required to complete a ring of the group consisting of cyclopentane, cyclohexane, 2,3-dihydrobenzo furan and 2,3-dihydroindole; $R^3$ and $R$ each represent a radical of the group consisting of aromatic and heterocyclic radicals, which are free of groupings capable of coupling to form colored reaction products with oxidation products of aromatic amine silver halide developing agents.

9. A photographic material comprising in combination at least one silver halide emulsion layer which contains at least one uncolored-color-forming coupler which is reactive with the development product of a primary amine developing agent to form a dyestuff in the said layer, and at least one silver halide emulsion layer which contains a dihydrazone of the general formula

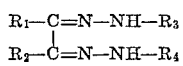

in which $R_1$ and $R_2$ each represent a radical of the group consisting of hydrogen, alkyl up to 20 carbon atoms, phenyl, naphthyl, benzyl, furyl, thienyl, 2-benzofuranyl, benzothienyl, and pyridyl; $R_1$ and $R_2$ together with the carbon atoms adjacent to each are the atoms required to complete a ring of the group consisting of cyclopentane, cyclohexane, 2,3-dihydrobenzo furan and 2,3-dihydroindole; $R_3$ and $R_4$ each represent a radical of the group consisting of aromatic and heterocyclic radicals, which are free of groupings capable of coupling to form colored reaction products with oxidation products of primary aromatic amine sliver halide developing agents.

10. A photographic material according to claim 9 in which the said uncolored-color-forming coupler is a pyrazolone derivative which reacts with the development product of the developer to form a magenta dyestuff image.

11. A photographic material as defined in claim 9 in which the said uncolored-color-forming coupler is an α-naphthol derivative which reacts with the development product of the developer to form a cyan dyestuff image.

12. A photographic material according to claim 9 in which the said silver halide emulsion layers containing the said uncolored coupler and the said dihydrazone are sensitive to the same region of the spectrum.

13. A photographic material according to claim 9 in which the said uncolored-color-forming coupler and the said dihydrazone are incorporated in the same silver halide emulsion layer.

14. A process as defined in claim 1 in which the dihydrazone is the compound represented by the formula in claim 1 in which $R_1$ and $R_2$ together are an isatin ring and $R_3$ and $R_4$ are each 4-n-octadecyloxy-3-sulfophenyl.

References Cited by the Examiner
UNITED STATES PATENTS

| | | | |
|---|---|---|---|
| 2,276,254 | 3/42 | Schinzel | 96—55 |
| 2,375,344 | 5/45 | Bruylants | 96—55 |
| 2,527,476 | 10/50 | Bruylants | 96—55 |
| 2,588,982 | 3/52 | Ives | 96—64 |
| 2,604,400 | 7/52 | Bean et al. | 96—64 |
| 2,655,538 | 10/53 | Jensch et al. | 260—564 |
| 2,655,539 | 10/53 | Jensch et al. | 260—564 |
| 2,998,314 | 8/61 | Puschel | 96—55 |
| 3,028,237 | 4/62 | Loffler | 96—55 |

FOREIGN PATENTS 685,061  12/52  Great Britain.

OTHER REFERENCES

Hann et al.: Journal American Chemical Society, vol. 66, pages 735–7 (1944). (Copy in Scientific Library.)

NORMAN G. TORCHIN, *Primary Examiner*.

HAROLD N. BURSTEIN, *Examiner*.